(No Model.)
J. G. BUSFIELD.
SPOOL HOLDER.
No. 592,863. Patented Nov. 2, 1897.
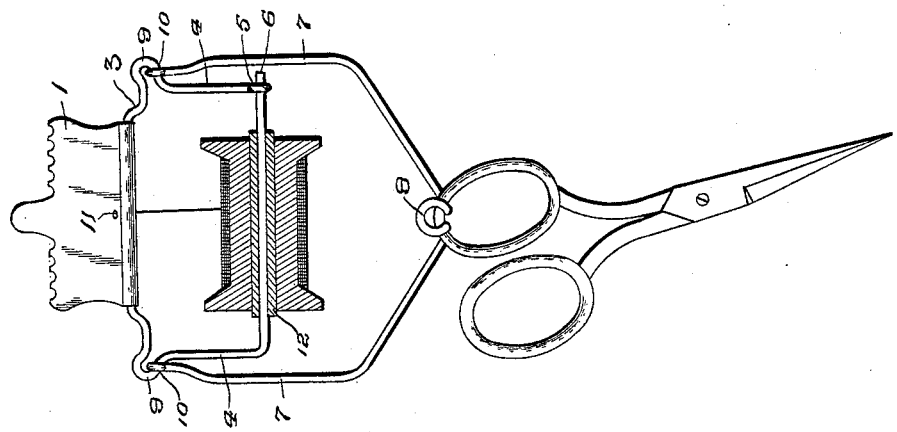
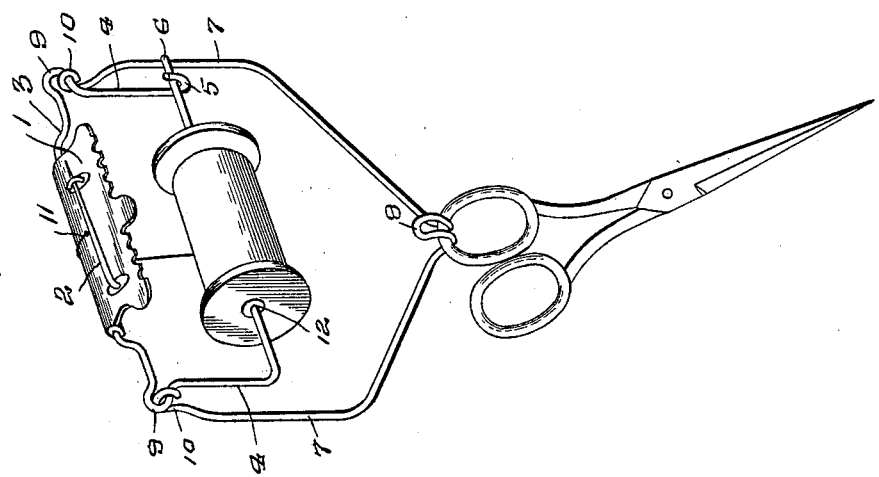
Witnesses
C. D. Kesler
Alex Scott
Inventor
John J. Busfield
By John Wedderburn
Attorney

United States Patent Office.

JOHN G. BUSFIELD, OF WOBURN, MASSACHUSETTS.

SPOOL-HOLDER.

SPECIFICATION forming part of Letters Patent No. 592,863, dated November 2, 1897.

Application filed November 28, 1896. Serial No. 613,755. (No model.)

*To all whom it may concern:*

Be it known that I, JOHN G. BUSFIELD, a citizen of the United States, residing at Woburn, in the county of Middlesex and State of Massachusetts, have invented certain new and useful Improvements in Spool and Scissors Holders; and I do hereby declare the following to be a full, clear, and exact description of the invention, such as will enable others skilled in the art to which it appertains to make and use the same.

This invention has reference to a novel construction in a spool and scissors holder, the object being to provide a simple and inexpensive device of this character that can be worn by the user and which will always hold the spool of cotton or silk and scissors in a convenient position for use.

The invention consists in certain novel features of construction hereinafter fully described and claimed.

In the accompanying drawings, forming part of this specification, Figure 1 is a perspective view of the invention with the spool and scissors supported thereby. Fig. 2 is a front elevation with the spool shown in section.

Referring to the drawings, 1 is a plate provided on its rear face with a safety-pin 2, by means of which this device may be secured to some portion of a garment of the wearer. To the lower end of said plate 1 is pivoted a frame 3, having downward extensions 4, one of which is provided with a hook 5 to receive the spring-arm 6, carried by the other of said downward extensions. The pivotal connection between the plate 1 and said frame 3 is obtained by bending the lower edge of the plate around the upper straight portion of the wire composing the frame in the manner shown. A bail 7 is pivoted at its upper ends to the said frame 3 and provided at its lower ends with a hook 8. In the construction illustrated the frame and bail are made of wire suitably bent into the shape shown, and the pivotal connection between the bail 7 and the frame 3 consists of eyes 9 at the upper corners of the frame and eyes 10 at the upper end of the bail. The said plate 2 is provided with an opening 11, through which the cotton or silk is passed, while the finger 6 is provided with a bushing 12, which extends into the opening of the spool, so as to create enough tension between the spool and the finger to prevent the spool from unnecessary unwinding.

The device is shown in the drawings in the position that it is when in use, and it is seen that the cotton from the spool passes upwardly and through the opening 11 in the plate 2, so that there is always a projecting end ready to be grasped. The hook 8 upon the bail provides a convenient place from which the scissors can be supported in a position to be ready for immediate use.

Having thus described my invention, what I claim as new, and desire to secure by Letters Patent, is—

A spool and scissors holder consisting of a plate provided on its rear face with a pin, having its lower edge bent, and having an opening, a frame consisting of a piece of wire pivoted to said plate by having an upper straight portion held within the bent lower edge of the plate, eyes at the end of said straight portion, downward extensions depending from said eyes, an arm at the lower end of one of said extensions, a hook at the lower end of the other of said extensions to engage the free end of said arm, and a bail having its ends secured within said eyes and being of sufficient size to surround said frame and provided at its lower end with a hook.

In testimony whereof I have signed this specification in the presence of two subscribing witnesses.

JOHN G. BUSFIELD.

Witnesses:
GEORGE S. HUDSON,
EDWARD J. GREGORY.